United States Patent [19]
Henmi et al.

[11] Patent Number: 5,848,220
[45] Date of Patent: Dec. 8, 1998

[54] HIGH DEFINITION DIGITAL VIDEO RECORDER

[75] Inventors: Fumiaki Henmi; Yoshihiro Murakami; Takashi Sasaya, all of Kanagawa; Takao Abe, Tokyo, all of Japan

[73] Assignee: Sony Corporation, Tokyo, Japan

[21] Appl. No.: 802,855

[22] Filed: Feb. 19, 1997

[30] Foreign Application Priority Data

Feb. 21, 1996 [JP] Japan ...................................... 8-033982

[51] Int. Cl.⁶ .............................. H04N 5/917; H04N 5/91; H04N 11/02
[52] U.S. Cl. .............................. 386/109; 386/123; 386/33
[58] Field of Search .................................. 386/33, 27, 26, 386/34, 109, 111, 112, 124, 123, 46; 360/32; H04N 5/917, 5/91, 11/02

[56] References Cited

U.S. PATENT DOCUMENTS

| | | | |
|---|---|---|---|
| 5,027,222 | 6/1991 | Shinbo et al. | 386/27 |
| 5,257,107 | 10/1993 | Hwang et al. | 386/33 |
| 5,303,060 | 4/1994 | Iwamura et al. | 386/33 |
| 5,541,739 | 7/1996 | Tanaka | 386/33 |

*Primary Examiner*—Robert Chevalier
*Attorney, Agent, or Firm*—Jay H. Maioli

[57] ABSTRACT

A digital video tape recorder with a standard image quality mode that minimizes recording time and a high image quality mode that maximizes image quality is realized using the same hardware for both modes. Compression circuitry is simplified and power requirements are reduced by band limiting an input video signal before the signal is compressed using a bit rate reduction encoder.

8 Claims, 7 Drawing Sheets

HIGH DEFINITION DIGITAL VIDEO RECORDER

BACKGROUND OF THE INVENTION

1. Field of the Invention

The present invention relates generally to the field of digital video tape recorders and, in particular, to digital video tape recorders for recording signals in both a standard image quality mode and a high image quality mode.

2. Description of Related Art

Generally, digital video tape recorders use compression techniques to record images. An increased compression rate increases the length of time that a video signal can be recorded on the same amount of tape. Alternately, if the compression rate of the video signal is reduced, the image quality is improved.

In the previously proposed systems, compression algorithms used by digital video tape recorders are executed by application-specific circuits. Recording and playback of signals at more than one compression rate required additional circuitry.

Also, digital video tape recorders for different applications required that semiconductor integrated circuits be designed exclusively for each application. This results in increased cost for digital video tape recorders.

OBJECTS AND SUMMARY OF THE INVENTION

A first object of the present invention is to fabricate a digital video tape recorder with a standard image quality mode that minimizes recording time and a high image quality mode that maximizes image quality using the same hardware.

A second object of the present invention is to fabricate a digital video recorder with a reduced cost by using the same circuitry to perform compression in standard image quality and high image quality modes.

A third object of the present invention is to fabricate a digital video recorder with reduced power consumption, reduced noise, so-called mosquito noise, and reduced memory requirements by band limiting an input digital signal prior to compression using a bit rate reduction encoder.

In a digital video tape recorder according to a first aspect of the present invention, a digital video signal is band-limited by band limiting means, band-compressed by a bit rate reduction encoder circuit, and then recorded.

According to a second aspect of this invention, a digital video tape recorder with a standard image quality mode and a high image quality mode can be fabricated using a single set of hardware by changing the band compression rate of a bit rate reduction encoder circuit.

DETAILED DESCRIPTION OF THE PREFERRED EMBODIMENTS

Figure 1:
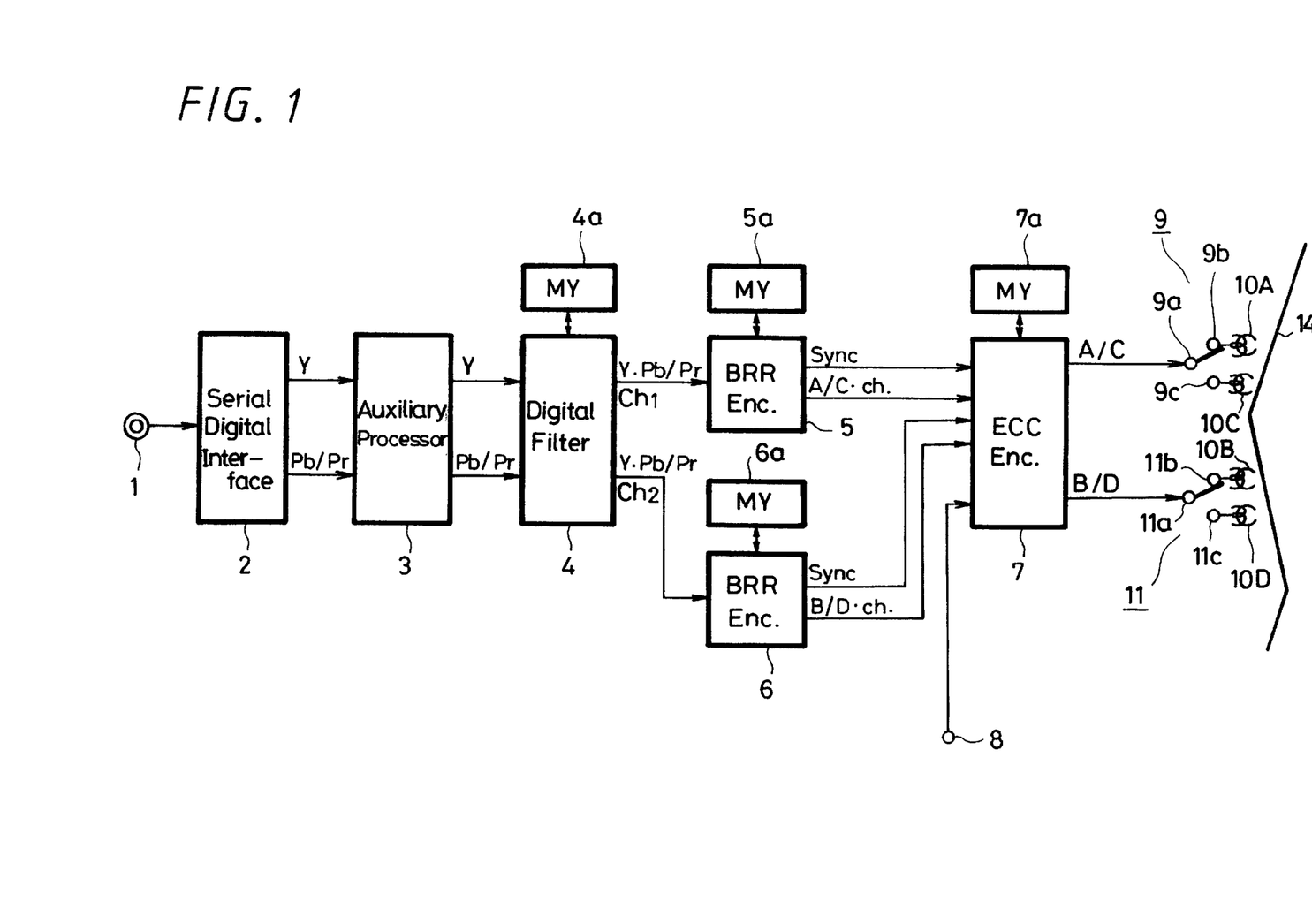
FIG. 1 is a diagram showing a recording configuration in standard image quality mode of a digital video tape recorder according to the present invention.
Figure 2:
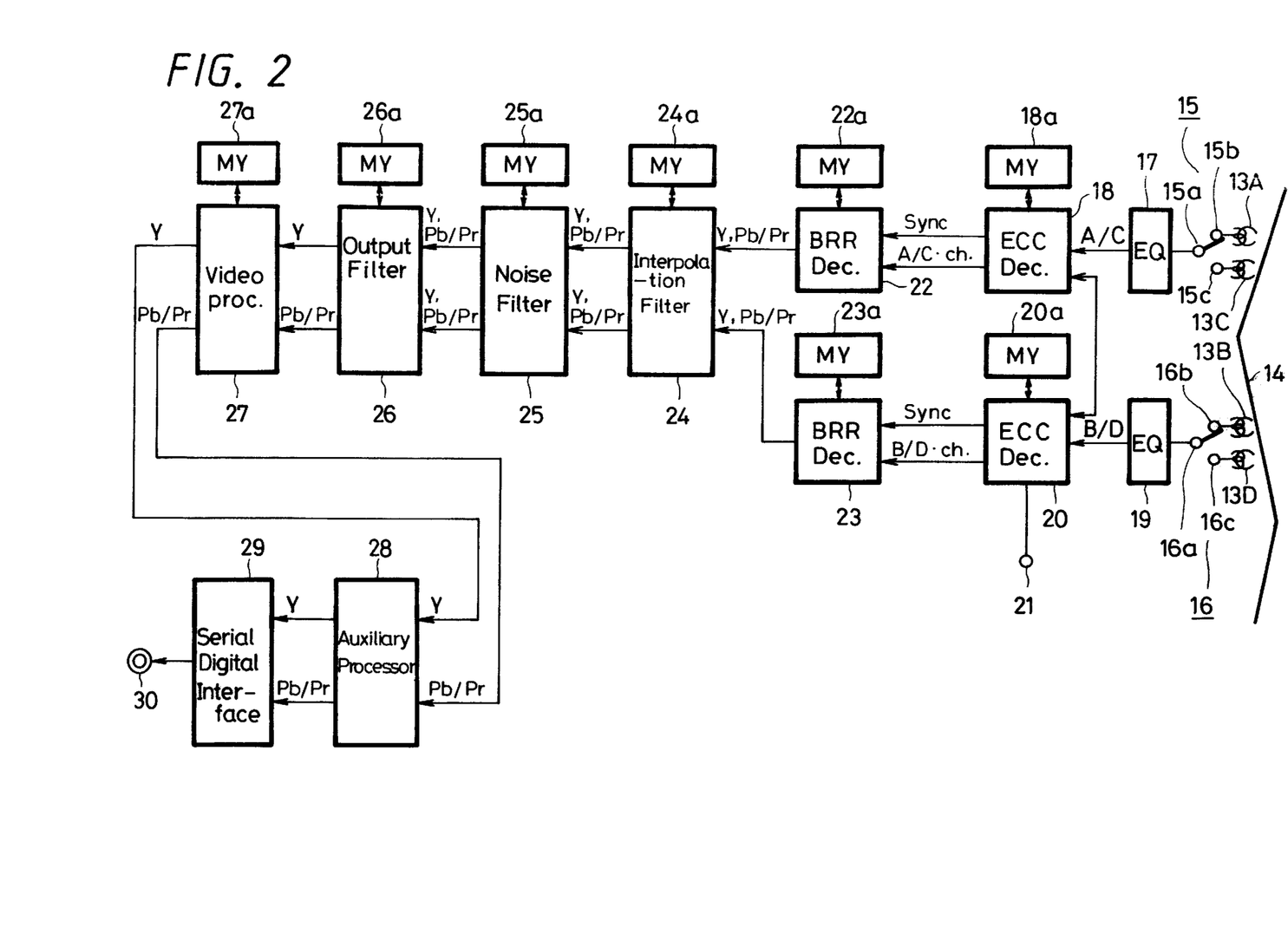
FIG. 2 is a diagram showing a playback configuration in the standard image quality mode of a digital video tape recorder according to the present invention.

An embodiment of a digital video tape recorder according to this invention will be described with reference to the drawings. FIG. 1 shows an example of a digital video tape recorder for recording in the standard image quality (SQ) mode. FIG. 2 is an example the same digital video recorder used to playback signals recorded in the SQ mode.

An input terminal 1 is supplied with a digital color image data signal. The digital signal is a 4:2:2-type serial digital signal. Luminance Y, R-Y color difference Pr, and B-Y color difference Pb are supplied with a sampling frequency ratio of 4:2:2.

The 4:2:2 serial digital signal supplied to the input terminal 1 is applied to a serial digital interface circuit 2 that converts the serial digital signal into an 8-bit parallel digital signal. This digital signal is supplied to an auxiliary processor 3 for performing ancillary data processing.

The parallel digital signal produced by the auxiliary processor 3 is applied to a digital filter 4 to band limit the 4:2:2 signal to a 3:1:1 signal. A memory 4a is used for data processing by the digital filter 4.

Band-limiting the 4:2:2 signal to a 3:1:1 signal results in a band compression factor of 5/8.

In the SQ mode, the digital filter 4 produces first and second channel signals Ch1 and Ch2 by parsing the Y, Pr, and Pb signal in each frame into two portions at predetermined time intervals. The first and second channel signals Ch1 and Ch2 thus obtained are applied to bit rate reduction encoder circuits 5 and 6, respectively.

The bit rate reduction encoder circuits 5 and 6 have a band compression factor of 8/35. The overall band compression ratio of the combination of the digital filter 4 and the bit rate reduction encoders 5, 6 is thus 1/7 in the SQ mode. The bit rate reduction circuits 5,6 can be any of the known circuits of that kind.

In this example, the bit rate reduction encoder circuits 5 and 6 have exactly the same internal configuration. The compression is performed in intraframe fashion. This is because the intraframe compression can achieve a higher compression ratio than interframe compression for the same image quality.

Figures 5A, 5B:
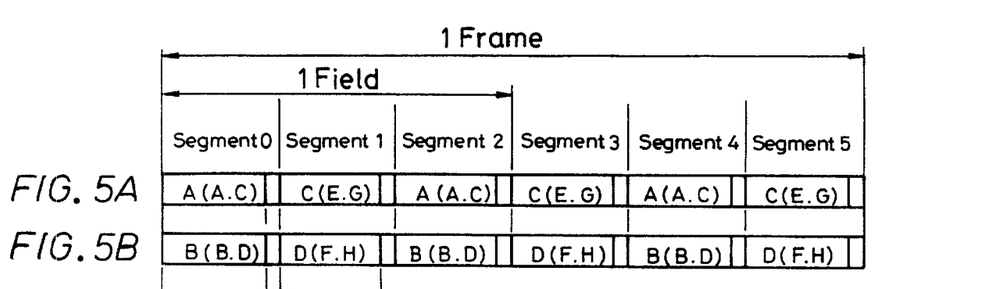
FIGS. 5A–5J are diagrams showing the relative timing of signal segments according to the present invention.

The bit rate reduction encoders 5 and 6 each have an associated memory 5a and 6a, respectively, for use by the compression algorithm. The bit rate reduction encoder circuits 5, 6 provide a bit rate reduction signal for each frame, as shown in FIGS. 5A and 5B. The bit rate reduction signal for each frame is represented by six signal segments among which the original compressed signal is divided. Each segment of the signal in the SQ mode, as shown in FIGS. 5C1, 5C2, 5D1 and 5D2, includes 225 sync blocks. Each sync block in the SQ mode includes 1008 clock pulses, and each signal segment is recorded on one track.

Figures 5C, 5C:
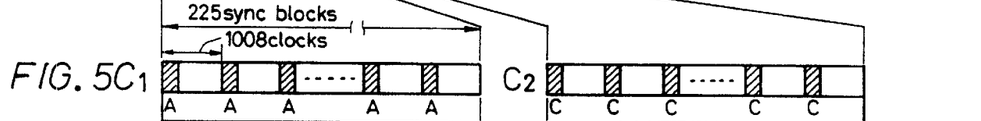

In other words, the first, third, and fifth signal segments produced by the bit rate reduction encoder circuit 5 in the SQ mode, as shown in FIGS. 5A and 5C1, are A channel signals each having 225 sync blocks. The second, fourth, and sixth signal segments of the compressed signal are C channel signals each having 225 sync blocks, as shown in FIGS. 5A and 5C2.

Figures 5D, 5D:
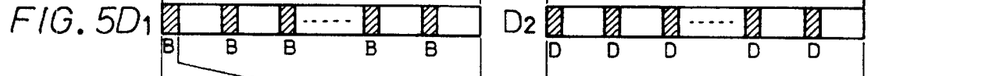

The first, third, and fifth signal segments of the compressed signal produced by the bit rate reduction encoder circuit 6, as shown in FIGS. 5B and 5D1, are B channel signals each having 225 sync blocks. The second, fourth, and sixth segment signals of compressed signal, as shown in FIGS. 5B and 5D2, are D channel signals each having 225 sync blocks.

Figures 5E, 5F:
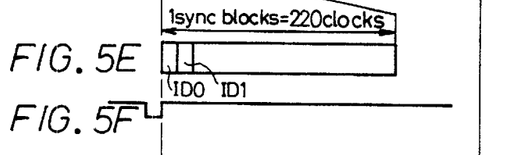

Each sync block in the SQ mode has 220 clocks for an identification signal ID followed by image data. The remaining portion is blank, as shown in FIG. 5E. A frame sync signal is shown in FIG. 5F.

The bit rate reduction signals shown in FIGS. 5A and 5B produced by the bit rate reduction encoder circuits 5 and 6, respectively, and the frame sync signal shown in FIG. 5F, are applied to an error correction code encoder circuit 7. Audio data is applied from an audio data input terminal 8 to the error correction code encoder circuit 7.

The circuit used as the error correction code encoder circuit 7 can be any of the known circuits of that kind. The error correction encoded A and C channel signals from the error correction code encoder circuit 7 are supplied to a movable contact 9a of a change-over switch 9. Error correction encoded B and D channel signals produced by the error correction code encoder circuit 7 are applied to a movable contact 11a of a change-over switch 11. Memory 7a is used for signal processing by the error correction code encoder circuit 7.

The movable contacts 9a and 11a of the change-over switches 9 and 11 switch in an interlocked fashion at predetermined time intervals equal to 1/6 of one frame. Connection is repeatedly switched between one set of fixed contacts 9b and 11b and the other set of fixed contacts 9c and 11c.

The A and B channel signals obtained at the fixed contacts 9b and 11b are applied to recording heads 10A and 10B, respectively. The recording heads 10A and 10B have different azimuthal angles on the rotary drum 12. The C and D channel signals obtained at the other set of fixed contacts 9c and 11c are applied to recording head 10C having the same azimuth as the recording head 10A and recording head 10D having the same azimuth as the recording head 10B, respectively.

Figure 3:
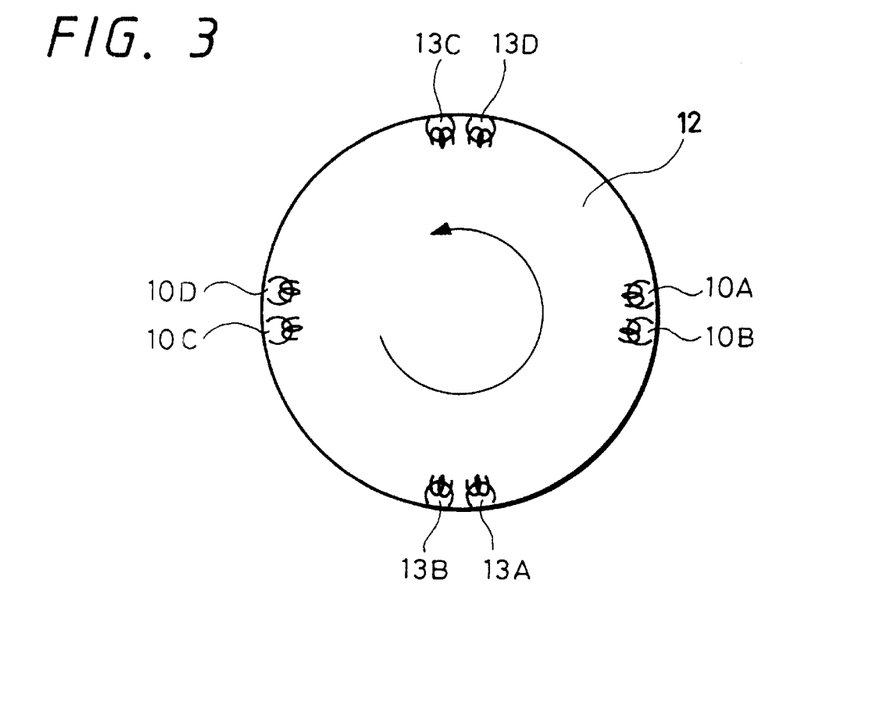
FIG. 3 is a diagram showing a rotary drum used by the circuits shown in FIGS. 1 and 2.

The rotary drum 12 in the SQ mode, as shown in FIG. 3, has four recording heads 10A, 10B, 10C, 10D arranged in pairs. Thus, two sets of adjacent recording heads 10A, 10B, and 10C, 10D are arranged at angular intervals of 180 degrees.

The rotary drum 12, as shown in FIG. 3, also has arranged thereon four reproduction heads 13A, 13B, 13C, 13D in pairs. The two sets of adjacent recording heads 13A, 13B and 13C, 13D are arranged at angular intervals of 180 degrees from each other and 90 degrees from the recording heads 10A, 10B, and 10C, 10D, respectively.

The azimuthal angles of the reproduction heads 13A, 13B, 13C, 13D are the same as those of the recording heads 10A, 10B, 10C, 10D, respectively.

Figure 4:
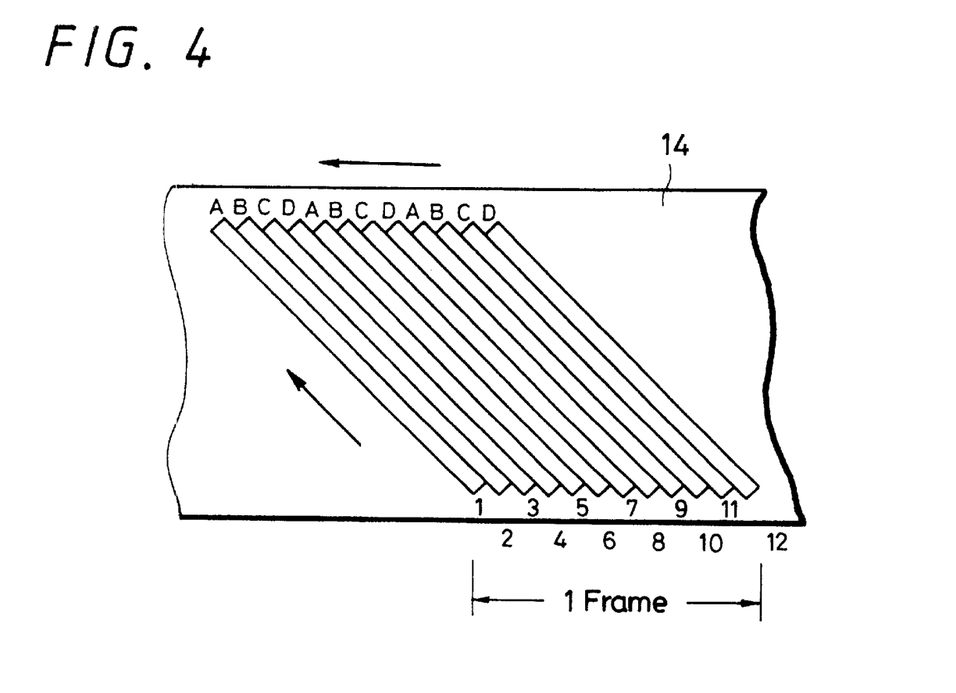
FIG. 4 is a diagram showing a section of recording tape in the standard image quality mode according to the present invention.

The rotary drum 12 is rotated counterclockwise as viewed from above, so that the A, B, C, and D channel signals of the signal segments are recorded as track patterns A, B, C, and D, respectively, on the magnetic tape 14 by the recording heads 10A, 10B, 10C, and 10D, as shown in FIG. 4.

In this example, the rotary drum 12 is adapted to make three revolutions for each frame of an image. Image information for a single frame is recorded over 12 tracks A, B, C, D, . . . ,D as shown in FIG. 4. The rotational speed of the rotary drum 12 is 90 Hz.

The playback configuration of this example in the SQ mode is described below with reference to FIG. 2. Specifically, the A channel signal of an A track and the B channel signal of a B track are reproduced by the reproduction heads 13A and 13B and are applied to one set of fixed contacts 15b, 16b of the change-over switches 15, 16, respectively. One half rotation of the rotation drum 12 later, the C channel signal of a C track and the D channel signal of a D track are reproduced by the reproduction heads 13C and 13D and are applied to the other set of fixed contacts 15c, 16c of the change-over switches 15, 16, respectively.

The movable contacts 15a, 16a of the change-over switches 15, 16 are simultaneously switched to change the connection between one set of fixed contacts 15b, 16b and the other set of fixed contacts 15c, 16c repeatedly in a predetermined phase at predetermined time intervals of 1/6 frame.

The A and C channel signals produced at the movable contact 15a of the change-over switch 15 are applied to an error correction code decoder circuit 18 through an equalizer circuit 17. The B and D channels produced at the movable contact 16a of the change-over switch 16 are supplied to an error correction code decoder circuit 20 through an equalizer circuit 19.

Audio data are exchanged between the error correction code decoder circuits 18 and 19, and the audio data thus error-corrected is output from an audio data output terminal 21. In FIG. 2, memories 18a and 20a are used for signal processing by the error correction code decoders 18 and 20, respectively.

Note only one error correction code encoder circuit 7 is included in the recording configuration, although two error correction code encoder circuits 18, 20 are incorporated in the playback configuration, in order to reduce the complexity of the associated integrated circuits. A more optimum configuration may be selected, however, depending on the chip cost and the number of gates per chip.

The A and C channel signals, corrected by the error correction code decoder circuit 18, and a frame sync signal are applied to the bit rate reduction decoder circuit 22. The B and D channel signals, corrected by the error correction code decoder circuit 20, and the frame sync signal are applied to the bit rate reduction decoder circuit 23.

The signals are decompressed by the bit rate reduction decoder circuits 22 and 23. The output signals of the bit rate reduction decoder circuits 22 and 23 are applied to an output digital filter 26 through an interpolation circuit 24. The interpolation circuit generates substitute data for image frames that have lost data due to recording or playback errors. A noise filter 25 then improves the image quality by means of temporal filtering.

The output digital filter 26 then reconverts the 3:1:1 signal back to a 4:2:2 signal. The output signal of the output digital filter 26 is supplied to a serial digital interface circuit 29 through a video processor 27 and an auxiliary processor 28 for regulating the gain and offset of the image signal. The parallel digital signal is converted into a serial digital signal by the serial digital interface circuit 29 producing a serial digital signal at an output terminal 30.

In the SQ mode, the image data compression ratio for band compression by the bit rate reduction encoder circuits 5 and 6 is set to 1/7. A digital video tape recorder in the SQ mode thus minimizes the recording time.

In the SQ mode, the 4:2:2 signal is band limited to the 3:1:1 signal by the digital filter 4. The image data is then band compressed to 1/7 by the bit rate reduction encoder circuits 5,6. Because the bandwidth is limited before it is applied to the bit rate reduction encoder circuit, a compression ratio of 1/7 can be achieved with a reduced amount of so-called mosquito noise compared to the case where a 4:2:2 signal is compressed directly by the same compression factor.

The power consumption of the bit rate reduction encoder circuits 5, 6 is proportional to the data rate. In the present example, the bit rate is reduced by the bit rate reduction encoder circuits 5, 6 after the 4:2:2 signal is band limited to 3:1:1 signal by the digital filter 4. Therefore, the power consumption of the bit rate reduction encoder circuits 5, 6 is reduced by a corresponding amount. Also, the memory capacity of the memories 5a and 6a for processing signals of the bit rate reduction encoder circuits 5 and 6 can be reduced, since a smaller data set associated with the band-limited signal needs to be manipulated.

Figure 6:
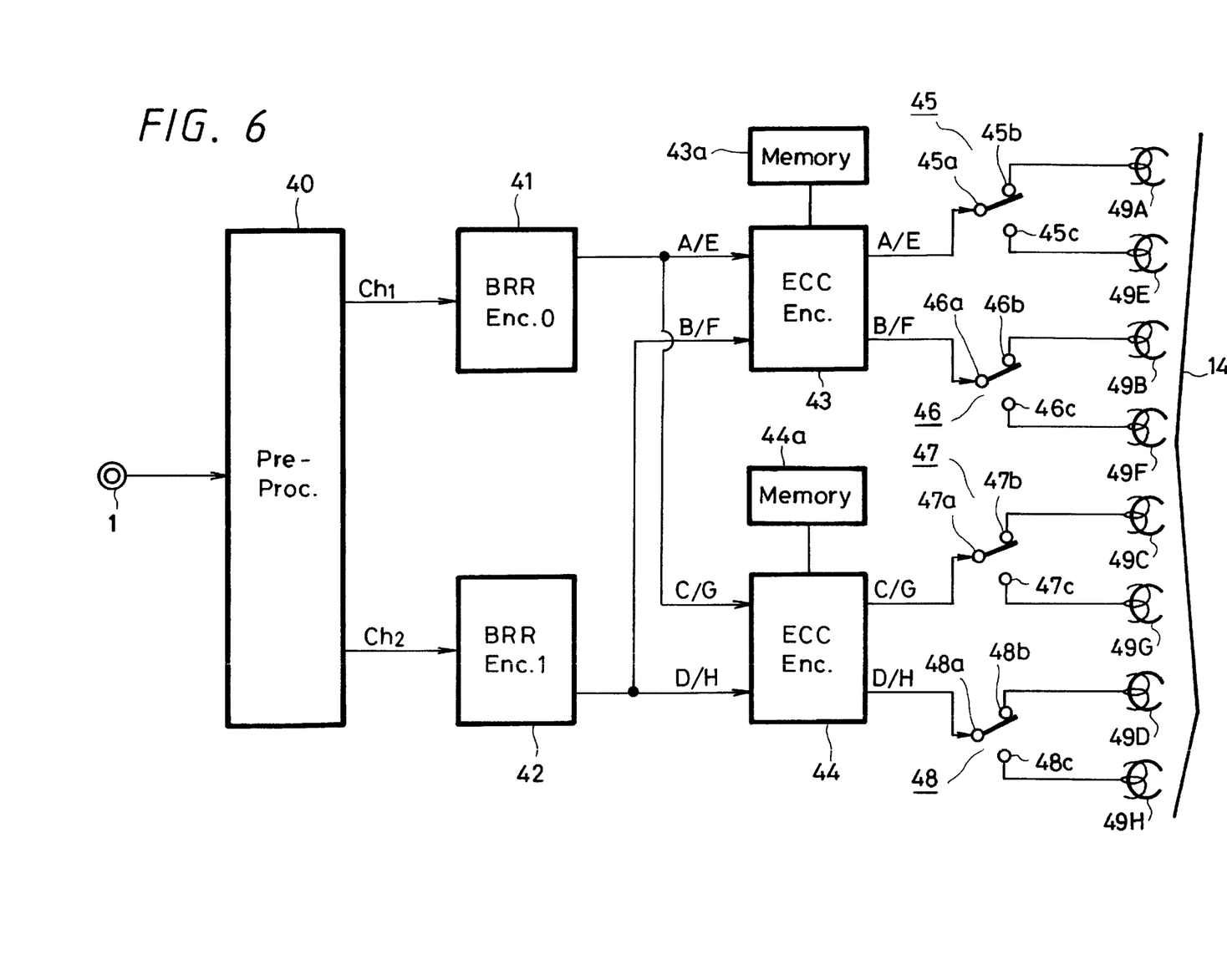
FIG. 6 is a diagram showing a recording configuration in the high image quality mode of a digital video tape recorder according to the present invention.
Figure 7:
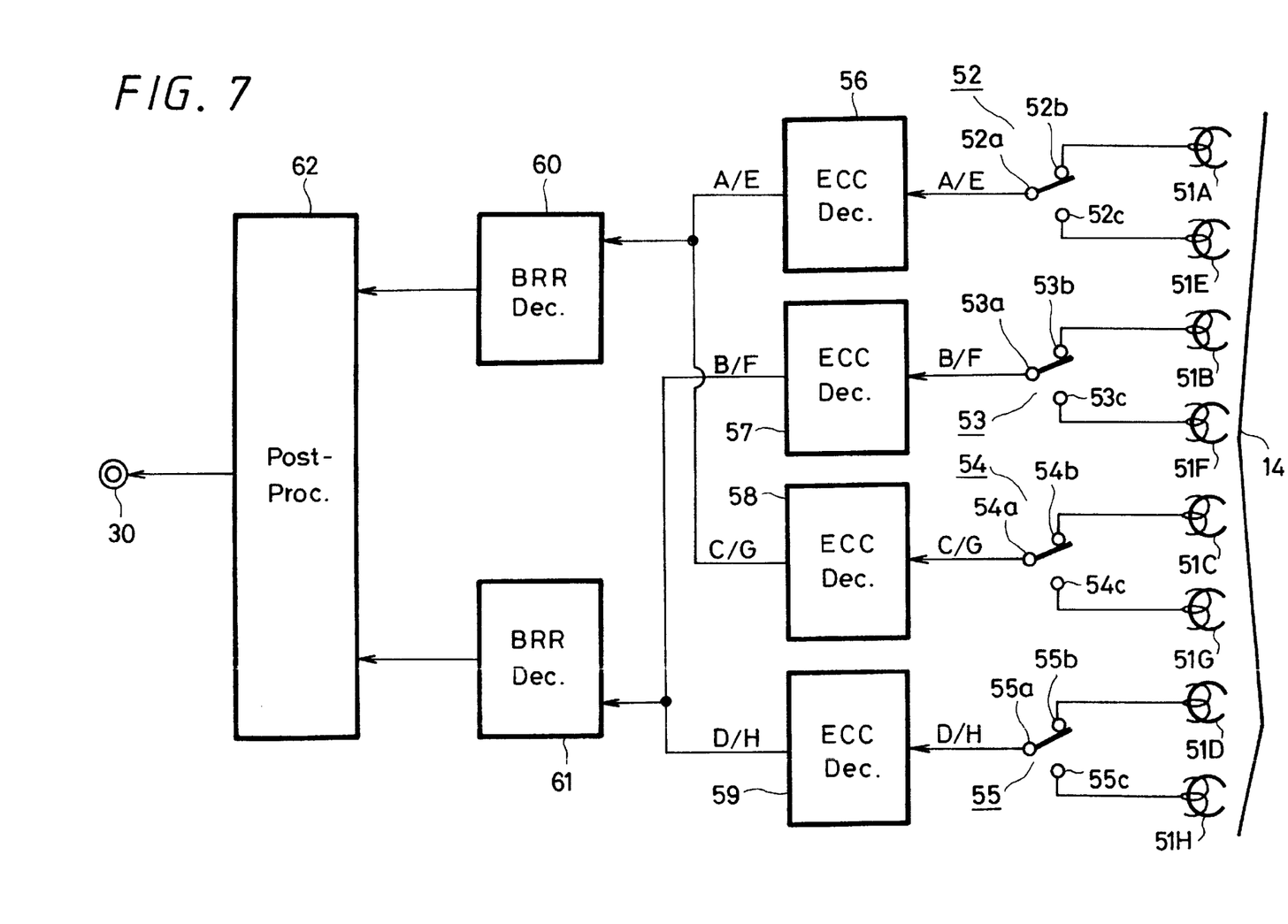
FIG. 7 is a diagram showing a playback configuration in the high image quality mode of a digital video tape recorder according to the present invention.

A digital video tape recorder in the high image quality (HQ) mode according to the present invention will be explained with reference to FIGS. 6 to 9. FIG. 6 shows an example of a recording configuration of a digital video tape recorder in the HQ mode. FIG. 7 shows a playback mechanism for the same device.

In FIGS. 6 to 9, the component parts corresponding to those in FIGS. 1 to 4 are designated by the same reference numerals and will not be described in detail. In FIGS. 6 and 7, the component parts corresponding to those in FIGS. 1 and 2 are shown in a simplified fashion.

In FIG. 6, a digital color image data signal is supplied to an input terminal 1 and then to a preprocessor 40. This digital signal is a 4:2:2-type serial digital signal. The sampling frequency ratio among the Y, Pr, and Pb signals is 4:2:2.

The preprocessor 40 includes the serial digital interface circuit 2, the auxiliary processor 3 and the digital filter 4 that were shown in FIG. 1. In the preprocessor 40 the 4:2:2 serial digital signal is converted into an 8-bit parallel digital signal and is band-limited from a 4:2:2 signal to a 3:1:1 signal.

The preprocessor 40 produces first and second channel signals Ch1 and Ch2 which represent the Y, Pr, and Pb signals for each image field divided into two segments at predetermined time intervals. The first and second channel signals Ch1 and Ch2 are applied to bit rate reduction encoders 41 and 42, respectively.

The bit rate reduction encoders 41 and 42 are configured in such a manner that channel signals CH1 and Ch2 are compressed to a 16/35 band compression ratio. Thus, the overall band compression ratio in the HQ mode is 2/7; that is, the ratio in the HQ mode is one half that of the SQ mode. The data rate in the HQ mode is, therefore, double that of the SQ mode. Known circuits are used for the bit rate reduction encoder circuits 41 and 42.

The bit rate reduction encoder circuits 41 and 42 have exactly the same internal configuration. Intrafield compression is used in the HQ mode. The intrafield compression results in the same dynamic tracking range as that of the bit rate reduction encoder circuits 5, 6 used for the SQ mode above.

The bit rate reduction encoder circuits 41 and 42 are designed so that intraframe or intrafield compression can be selected and also so that a compression ratio of 8/35 or 16/35 can be selected. By selecting intraframe compression at a 8/35 compression ration, the bit rate reduction encoder circuits 41 and 42 can also be used in the SQ mode.

A bit rate reduction signal for each field is produced as shown in FIGS. 5A and 5B by the bit rate reduction encoder circuits 41 and 42, respectively. Signals in the HQ mode are enclosed in parentheses of FIGS. 5A and 5B. The bit rate reduction signal for one field is divided into three signal segments. Each of these signal segments in the HQ mode includes 450 sync blocks as shown in FIGS. 5G1, 5G2, 5H1 and 5H2. Each of the sync blocks in the HQ mode has 504 clock pulses, and each signal segment in the HQ mode is recorded in two tracks.

Figures 5G, 5G:
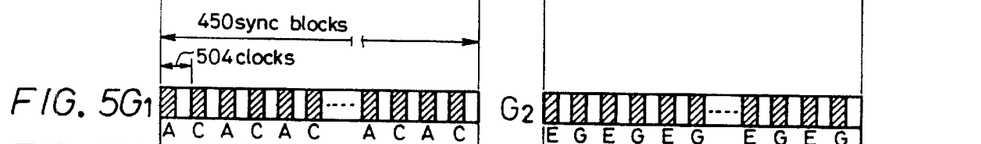

More specifically, the first, third, and fifth signal segments of a bit rate reduction signal produced by the bit rate reduction encoder circuit 41, as shown in FIGS. 5A and 5G1, each have an alternating arrangement of 225 A sync blocks and 225 C sync blocks. Each signal segment thus contains an A channel signal having 225 A sync blocks and a C channel signal having 225 C sync blocks.

The second, fourth, and sixth signal segments of the bit rate reduction signal, as shown in FIGS. 5A and 5G2, each represent an alternating arrangement of 225 E sync blocks and 225 G sync blocks, and thus include an E channel signal having 225 E sync blocks and a G channel signal having 225 G sync blocks.

Figures 5H, 5H:
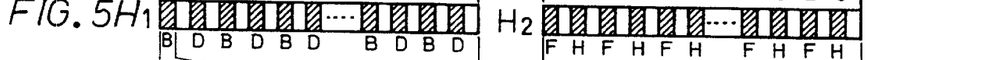

The first, third, and fifth signal segments of the bit rate reduction signal produced by the bit rate reduction encoder circuit 42, as shown in FIGS. 5B and 5H1, each represent 225 B sync blocks and 225 D sync blocks arranged alternating with each other, and thus have a B channel signal with 225 B sync blocks and a D channel signal with 225 D sync blocks.

The second, fourth, and sixth signal segments of this bit rate reduction signal, as shown in FIGS. 5B and 5H2, each represent 225 F sync blocks and 225 H sync blocks alternating with each other, and thus have an F channel signal with 225 F sync blocks and an H channel signal with 225 H sync blocks.

Figure 5I:
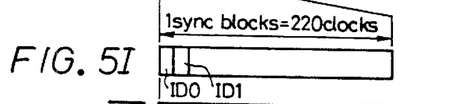
Figure 5J:
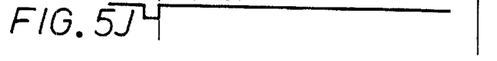

Each sync block in the HQ mode contains an identification signal ID0, ID1 and data for its first 220 clock pluses. The remainder of the sync block is blank, as shown in FIG. 5I. FIG. 5J shows a frame sync signal.

The A channel signal and the E channel signal produced by the bit rate reduction encoder circuit 41 are applied to an error correction code encoder circuit 43, while the C channel signal and the G channel signal produced by the bit rate reduction encoder circuit 41 are applied to a second error correction code encoder circuit 44.

The B channel signal and the F channel signal produced by the bit rate reduction code encoder circuit 42 are applied to an error correction code encoder circuit 43, while the D channel signal and the H channel signal produced by the bit rate reduction encoder circuit 42 are applied to the second error correction code encoder circuit 44.

Known circuits are used as the error correction code encoder circuits 43 and 44, which have respective memory circuits 43*a* and 44*a*.

The A and E channel signals encoded with error correction signals produced by the error correction code encoder circuit 43 are applied to a movable contact 45a of a first change-over switch 45. The B and F channel signals encoded with error correction signals produced by the error correction code encoder circuit 43 are applied to a movable contact 46a of a second change-over switch 46.

The C and G channel signals encoded with error correction signals produced by the error correction code encoder circuit 44 are applied to a movable contact 47c of a third change-over switch 47. The D and H channel signals encoded with error correction signals produced by the error correction code encoder circuit 44 are applied to a movable contact 48a of a fourth change-over switch 48.

In the present example, the connection of the movable contacts 45a, 46a of the first and second change-over switches 45, 46 are switched repeatedly between one set of fixed contacts 45b, 46b and the other set of fixed contacts 45c, 46c, respectively, simultaneously at regular intervals of 1/6 frame and synchronously with the frame sync signal. Also, the connection of the movable contacts 47a, 48a of the third and fourth change-over switches 47, 48 are switched repeatedly between one set of fixed contacts 47b, 48b and the other set of fixed contacts 47c, 48c, respectively, simultaneously at regular intervals of 1/6 frame delayed by a period of 1/6 field behind the frame sync signal.

Figure 8:
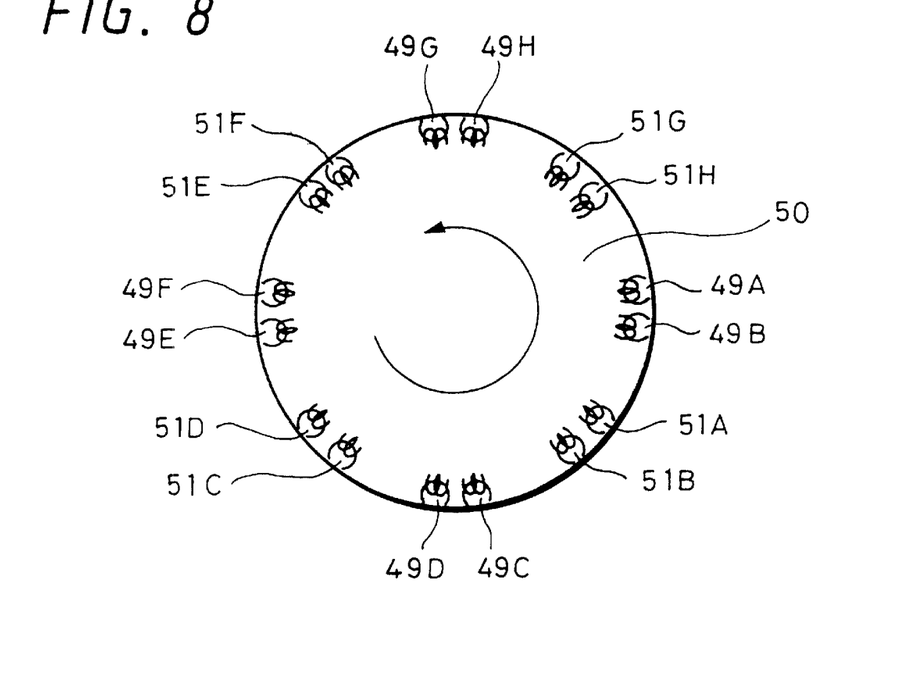
FIG. 8 is a diagram showing a rotary drum used with the circuits shown in FIGS. 6 and 7.

The A and B channel signals produced at the fixed contacts 45b, 46b of the first and second change-over switches 45, 46 are applied to adjacently arranged recording heads 49A and 49B having different azimuths and mounted on a rotary drum 50 as shown in FIG. 8. The E and F channel signals produced at the fixed contacts 45c, 46c are applied to a recording heads 49E and 49F. Heads 49E and 49F are angularly displaced 180 degrees from heads 49A and 49B. Head 49E and 49F have the same azimuthal angle as heads 49A and 49B, respectively.

The C and D channel signals produced at the fixed contacts 47b, 48b of the third and fourth change-over switches 47, 48 are applied to a recording heads 49C and 49D, respectively. Heads 49C and 49D are angularly displaced 90 degrees from heads 49A and 49B and have the same azimuthal angle, respectively. The G and H channel signals produced at the fixed contacts 47c, 48c are applied to a recording heads 49G and 49H. Heads 49G and 49H are angularly displaced 180 degrees from heads 49C and 49D and have the same azimuth, respectively.

Thus, rotary drum 50, as shown in FIG. 8, has eight recording heads 49A, 49B, 49C, 49D, 49E, 49F, 49G, 49H in pairs. The pairs of the recording heads 49A and 49B, 49C and 49D, 49E and 49F, and 49G and 49H are arranged sequentially at angular intervals of 90 degrees.

Also, as shown in FIG. 8, eight playback heads 51A, 51B, . . . ,51H are arranged in pairs on the rotary drum 50. The pairs of the adjacent playback heads 51A and 51B, 51C and 51D, 51E and 51F, and 51G and 51H are arranged at angular intervals of 90 degrees between the pairs of recording heads 49A and 49B, 49C and 49D, 49E and 49F, and 49G and 49H, respectively.

The playback heads 51A, 51B, 51C, 51D, 51E, 51F, 51G and 51H are structured to have the same azimuthal angles as the recording heads 49A, 49B, 49C, 49D, 49E, 49F, 49G and 49H, respectively.

The rotary drum 50 in the HQ mode is rotated counter-clockwise as viewed from above. The diameter, rotational speed and the recording track width of the rotary drum 50 are the same as those of the rotary drum in the SQ mode described above, however, the feed rate of the magnetic tape 14 is twice that of the SQ mode described above.

Figure 9:
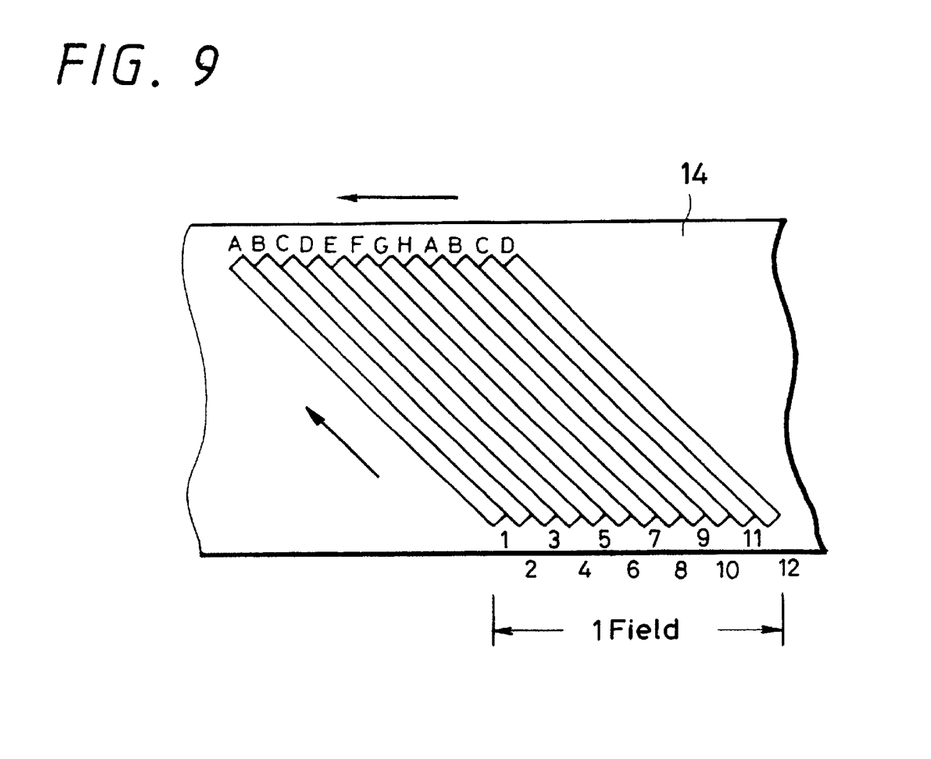
FIG. 9 is a diagram showing a section of recording taped in the high image quality mode according to the present invention.

The A, B, C, D, E, F, G, and H channel signals are recorded as track patterns A, B, C, D, E, F, G, and H, respectively, on the magnetic tape 14 by means of the recording heads 49A, 49B, . . . ,49H. The image information for a field is recorded over the 12 tracks A, B, C, D, . . . ,H, A, B, C, D, as shown in FIG. 9.

The configuration of a digital video recorder for playing back signals in the HQ mode will be described with reference to FIG. 7.

The A channel signal for A track information and the B channel signal for B track information are reproduced by the playback heads 51A and 51B and are applied to one set of fixed contacts 52b, 53b of change-over switches 52, 53, respectively. The E channel signal for E track information and the F channel signal for F track information are reproduced by the playback heads 51E and 51F and are supplied to the other set of fixed contacts 52c, 53c of the change-over switches 52, 53, respectively.

Movable contacts 52a, 53a of the change-over switches 52, 53 are operated simultaneously with each other to switch the connection between one set of the fixed contacts 52b, 53b and the other set of the fixed contacts 52c, 53c in a predetermined phase at regular time intervals of 1/6 frame.

The C channel signal for C track information and the D channel signal for D track information reproduced by the reproduction heads 51C, 51D and are applied to one set of fixed contacts 54b, 55b of change-over switches 54, 55, respectively. The G channel signal for G track information and the H channel signal for H track information are reproduced by the reproduction heads 51G, 51H and are applied to the other set of fixed contacts 54c, 55c of the change-over switches 54, 55, respectively.

Movable contacts 54a, 55a of the change-over switches 54, 55 are operated simultaneously with each other to switch the connection between one set of the fixed contacts 54b, 55b and the other set of the fixed contacts 54c, 55c repeatedly at regular intervals of 1/6 frame and in a phase 1/6 frame behind the switching of the change-over switches 52, 53.

The A and E channel signals produced at the movable contact 52a of the change-over switch 52 are applied to the error correction code decoder circuit 56. The B and F channel signals produced at the movable contact 53a of the change-over switch 53 are applied to the error correction code decoder circuit 57.

The C and G channel signals produced at the movable contact 54a of the change-over switch 54 are applied to the error correction code decoder circuit 58. The D and H channel signals produced at the movable contact 55a of the change-over switch 55 are supplied to the error correction code decoder circuit 59.

Errors in the A and E channel signals are corrected by the error correction code decoder circuit 56. Errors in the C and G channel signals are corrected by the error correction code decoder circuit 58. The corrected A, E, C, and G signals are applied to a bit rate reduction decoder circuit 60.

Errors in the B and F channel signals are corrected by the error correction code decoder circuit 57. Errors in the D and H channel signals are corrected by the error correction code decoder circuit 59. The corrected B, F, D, and H signals are applied to a bit rate reduction decoder circuit 61.

The bit rate reduction decoder circuits 60 and 61 decompress signals by a factor that is the inverse of the compression ratio of the bit rate reduction encoders 41, 42. In this embodiment the compression ration for the HQ mode is 16/35. Thus, the bit rate reduction encoders 60, 61 expand the image signal by a factor of 35/16. The circuits used as the bit rate reduction decoder circuits 60, 61 can be any of the known circuits of that kind.

The bit rate reduction decoder circuits 60, 61 are designed to decompress in either an intraframe and intrafield mode and also to expand signals compressed at either a 8/35 or a 16/35 compression ratio. In this way, the bit rate reduction decoder circuits 60, 61 can be used to decompress signals in both the SQ and the HQ modes.

The output signals of the bit rate reduction decoders 60, 61 are applied to a postprocessor 62. The postprocessor conceals errors by interpolating missing data segments and improves the image quality with a temporal filter.

The postprocessor 62 also converts the band-limited 3:1:1 signal into a 4:2:2 signal, regulates the gain and offset of the image signal, converts the parallel digital signal to a serial digital signal, and supplies the digital video signal to output terminal 30.

In the HQ mode, the image data are compressed at a compression ratio one half that of the SQ mode by band compression in the bit rate reduction encoder circuits 41, 42. The lower compression ration leads to enhanced image quality.

In both the SQ and the HQ modes the 4:2:2 signal is band limited to the 3:1:1 signal prior to band compression by the bit rate reduction encoder circuits 41,42 and 5, 6. As a result, the bit rate reduction encoders 41, 42 and 5, 6 must compress a smaller data set to achieve the same overall compression ratio. This results in a reduction of the so-called mosquito noise.

The power consumption of a bit rate reduction encoder circuit is proportional to the rate at which it receives data. In this example, the 4:2:2 signal is band limited to a 3:1:1 signal before it is compressed by the bit rate reduction encoder circuits 41, 42 and 5, 6. The power consumption of the bit rate reduction encoder circuits 41, 42 and 5,6 can thus be proportionately reduced. Further, the capacity of the signal processing memories 43a, 44a and 5a, 6a for the bit rate reduction encoder circuits 41, 42 and 5, 6, respectively, can be reduced by an amount equivalent to the reduction in the data set due to band-limitation.

In this example, the compression ratio in the SQ mode is twice as high as that for the HQ mode, and hence the data rate after compression for the HQ mode is double that for the SQ mode. Nevertheless, the same clock frequency is used to transfer the data stream from the recorded tape to the error correction code encoder circuits 43, 44 and 18, 20. Therefore, the error correction code encoder in the SQ mode 7 can be identical to the encoders 43, 44 in the HQ mode. Similarly, the error correction code decoder circuits 18, 20 in the SQ mode can be identical to the decoder circuits 56, 57, 58, 59 in the HQ mode.

The recording and the playback configurations in the HQ mode, described above, are such that the feed rate of the magnetic tape is reduced to ½ that of an uncompressed signal with only a modest loss of image quality. In the SQ mode the tape feed rate is reduced to ¼ that of an uncompressed signal.

The bit rate reduction encoder circuits 41, 42 and the bit rate reduction decoder circuits 60, 61 can be selected to compress/decompress between an intraframe and an intrafield mode and at high and low compression ratios. Thus, a digital video tape recorder according to the present invention is capable of operating in both the SQ mode and the HQ mode.

The present invention is not limited to the above-mentioned embodiments, and various configurations can be realized without departing from the spirit and scope of the invention.

What is claimed is:

1. An apparatus for recording a digital video signal in one of a Standard Image Quality mode and a High Image Quality mode, comprising:

a band limiting filter for reducing a sampling ratio of said digital signal from an input sampling ratio to a predetermined sampling ratio and producing a band limited signal;

bit rate reduction means for compressing said band limited signal by a selected compression ratio using a selected compression mode and producing a compressed digital signal, wherein in said Standard Image Quality mode said compression ratio is selected to be 8/35 and in said High Image Quality mode said compression ratio is selected to be 16/35;

an error correction encoder for adding error detection information to said compressed digital signal and producing a compressed recording signal; and recording means for forming a recording of said compressed recording signal on a recording medium.

2. The apparatus according to claim 1 wherein said input sampling ratio comprises values of a luminance signal and chrominance signals of said digital video signal in a ratio of 4:2:2 and said predetermined sampling ratio comprises said values in a ratio of 3:1:1.

3. The apparatus according to claim 1 wherein said selected compression mode is selectable to be one of an intrafield compression or an intraframe compression.

4. The apparatus according to claim 1 further comprising:

playback means for recovering a digital signal from said recording medium and producing a recovered digital signal;

error detection means for detecting an error in said recovered digital signal based on said error detection information;

bit rate expansion means for decompressing said recovered digital signal by an inverse of said selected compression ratio and selected compression mode and producing a decompressed digital signal;

an interpolation filter for removing data containing an error detected by said error detecting means in said decompressed digital signal and replacing said removed data with interpolated data and producing an interpolated decompressed digital signal; and band expansion means for conversion of said interpolated decompressed digital signal from said predetermined sampling ratio to said input sampling ratio.

5. A method for recording a digital video signal in one of a Stand Image Quality mode and a High Image Quality mode, comprising the steps of:

band limiting said digital video signal from an input sampling ratio to a predetermined sampling ratio and producing a band limited signal;

compressing said band limited signal by a selected compression ratio using a selected compression mode and producing a compressed digital signal, wherein in said Standard Image Quality mode said compression ratio is selected to be 8/35 and in said High Image Quality mode said compression ratio is selected to be 16/35;

error encoding said compressed digital signal to add information for detecting errors in said compressed digital signal and producing compressed recording signal; and recording said compressed recording signal on a recording medium.

6. The method according to claim 5 wherein said input sampling ratio comprises values of a luminance signal and chrominance signals of said digital video signal in a ratio of 4:2:2 and said predetermined sampling ratio comprises said values in a ratio of 3:1:1.

7. The method according to claim 5 wherein said selected compression mode is selectable to be one of an intrafield compression or an intraframe compression.

8. The method according to claim 5 further comprising the steps of:

recovering said error encoded signal from said recording medium and producing a recovered digital signal;

detecting an error in said recovered digital signal based on said error detection information;

decompressing said recovered digital signal by an inverse of said selected compression ratio and selected compression mode and producing a decompressed digital signal from said band expanding said decompressed digital signal from said predetermined sampling ratio to said input sampling ratio.

\* \* \* \* \*